(12) United States Patent
Torkelson et al.

(10) Patent No.: US 8,303,876 B1
(45) Date of Patent: Nov. 6, 2012

(54) POLYMER-GRAPHITE NANOCOMPOSITES VIA SOLID-STATE SHEAR PULVERIZATION

(75) Inventors: John M. Torkelson, Skokie, IL (US); Katsuyuki Wakabayashi, Lewisburg, PA (US)

(73) Assignee: Northwestern University, Evanston, IL (US)

( * ) Notice: Subject to any disclaimer, the term of this patent is extended or adjusted under 35 U.S.C. 154(b) by 0 days.

(21) Appl. No.: 13/035,568

(22) Filed: Feb. 25, 2011

Related U.S. Application Data

(62) Division of application No. 12/391,003, filed on Feb. 23, 2009, now Pat. No. 7,906,053.

(60) Provisional application No. 61/066,523, filed on Feb. 21, 2008.

(51) Int. Cl.
*C08K 9/06* (2006.01)
*B29C 47/40* (2006.01)

(52) U.S. Cl. .............. 264/211.21; 264/176.1; 523/216; 524/445

(58) Field of Classification Search ............ 264/211.21, 264/176.1; 523/216; 524/445
See application file for complete search history.

(56) References Cited

U.S. PATENT DOCUMENTS

| | | | | |
|---|---|---|---|---|
| 5,049,289 A | * | 9/1991 | Jacobs | 508/128 |
| 5,814,673 A | | 9/1998 | Khait | |
| 6,180,685 B1 | | 1/2001 | Khait | |
| 6,500,892 B1 | * | 12/2002 | Bishop et al. | 524/445 |
| 7,223,359 B2 | * | 5/2007 | Torkelson et al. | 264/211.21 |
| 2002/0165306 A1 | * | 11/2002 | Gilmer et al. | 524/445 |

* cited by examiner

*Primary Examiner* — Robert D. Harlan
(74) *Attorney, Agent, or Firm* — Reinhart Boerner Van Deuren s.c.

(57) ABSTRACT

Polymer-graphite compositions and related methods of using solid-state shear pulverization as can be used to affect one or more physical properties thereof.

10 Claims, 3 Drawing Sheets

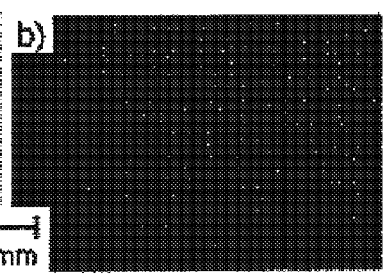
Figure 1A
Figure 1B
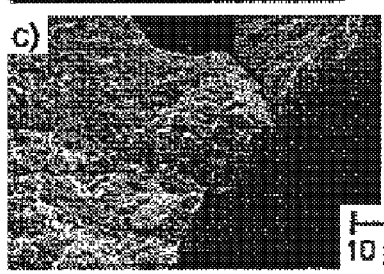
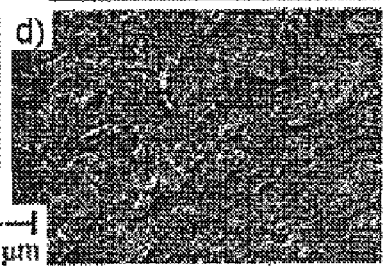
Figure 1C
Figure 1D
Figure 1E

POLYMER-GRAPHITE NANOCOMPOSITES VIA SOLID-STATE SHEAR PULVERIZATION

This application is a divisional of and claims priority benefit from application Ser. No. 12/391,003 filed Feb. 23, 2009, now issued as U.S. Pat. No. 7,906,053, which claimed priority benefit from application Ser. No. 61/066,523 filed Feb. 21, 2008, each of which are incorporated herein by reference.

This invention was made with government support under Grant No. DMR-0520513 awarded by the National Science Foundation. The government has certain rights in the invention.

BACKGROUND OF THE INVENTION

Polymer nanocomposites are of scientific and commercial interest because of their potential for enhanced properties compared to neat polymer. For example, improvements in mechanical properties are expected when high-aspect-ratio nanofillers are well-dispersed or exfoliated in polymer; prototypical nanofillers include layered silicates (clay) and carbon nanotubes. A carbon-based material of intense, recent focus in nanotechnology, is graphite. Despite its natural abundance and use since the Middle Ages, graphite and its derivatives have only recently emerged as a nanomaterial of choice, as exceptional mechanical and electrical properties are observed when the $sp^2$-hybridized carbon layers (termed "graphene sheets") are isolated or in "paper" form. Chemically similar to carbon nanotubes and structurally analogous to layered silicates, graphite has the potential to be an outstanding nanofiller in the form of individual graphene layers or nanoscale layered stacks.

Despite potential advantages, there are relatively few reports of graphite-based polymer nanocomposites, primarily because effective dispersion or exfoliation of graphite is practically impossible with melt processing. As a result, most polymer-graphite hybrids are made from chemically or thermally pretreated graphite, e.g., graphite oxide, expanded graphite, or thermally exfoliated graphite oxide. Even with pretreatment, nanocomposite production by conventional processing is challenging, as thermodynamic and/or kinetic limitations often lead to limited property enhancement.

SUMMARY OF THE INVENTION

In light of the foregoing, it is an object of the present invention to provide a range of graphite-based polymer composites and/or methods for their preparation, thereby overcoming various deficiencies and shortcomings of the prior art, including those outlined above. It will be understood by those skilled in the art that one or more aspect of this invention can meet certain objectives, while one or more other aspects can meet certain other objectives. Each objective may not apply equally, in all its respects, to every aspect of this invention. As such, the following objects can be viewed in the alternative with respect to any one aspect of this invention.

It can be an object of this invention to provide a method of using solid-state shear pulverization (SSSP) for preparation of polymer-graphite nanocomposite materials, without resort to chemical or thermal graphite pretreatment.

It can be another object of this invention to provide one or more methods of SSSP to enhance one or more mechanical or physical properties of the polymer-graphite composite, including but not limited to increased Young's modulus and increased yield strength, as compared to the corresponding neat polymer or extruded composites of the prior art.

Various other objects, features, benefits and advantages of this invention will be apparent from this summary and the descriptions of certain embodiments, and will be readily apparent to those skilled in the art having knowledge of various graphite-based polymer materials and processing techniques. Such objects, features, benefits and advantages will be apparent from the above as taken into conjunction with the accompanying examples, data, figures and all reasonable inferences to be drawn therefrom, alone or with consideration of the references incorporated herein.

In part, the present invention can be directed to a method of using as-received graphite to prepare a non-agglomerated polymer-graphite composite. Such a method can comprise providing a mixture comprising an as-received graphite component and a polymer component, such a graphite component neither chemically nor physically pre-treated and understood by those skilled in the art to be neither a graphite oxide nor an expanded graphite; and applying a mechanical energy to such a mixture through solid-state shear pulverization in the presence of cooling at least partially sufficient to maintain such a mixture in a solid state during pulverization, such pulverization at least partially sufficient to provide a polymer-graphite composite substantially absent graphite agglomeration. Without limitation, such non-agglomeration can be characterized by scanning electron microscopy and the absence of cracks and/or voids at micron length scales under microscopy conditions of the sort described herein or as would be otherwise understood by those skilled in the art made aware of this invention. Regardless such a pulverized polymer-graphite composite can be incorporated into an article of manufacture.

In certain non-limiting embodiments, such a graphite component can be present in an amount ranging from about 0.1 wt. % to about 10.0 wt. % of a polymer-graphite mixture. Regardless, without limitation, such a polymer component can be either a homopolymer or a copolymer thereof. In certain embodiments, such a polymer component can be selected from a range of polyolefins and copolymers thereof. In certain such embodiments, a graphite component can be present in an amount ranging from about 2 wt. % to about 4 wt. %, regardless of whether the polymer component is a polypropylene or another olefinic polymer or copolymer.

In part, the present invention can also be directed to a method of using solid-state shear polymerization to affect a physical property of a polymer-graphite composite. Such a method can comprise providing a mixture comprising a polymer component and an as-received graphite component of the sort discussed above and illustrated elsewhere herein; introducing such a mixture into a solid-state shear pulverization apparatus comprising a cooling component at least partially sufficient to maintain such a mixture in a solid state; shear pulverizing such a mixture with such pulverization at least partially sufficient to affect yield strength and/or Young's modulus of the mixture, such an affect as can be compared to such a mixture not shear pulverized; and discharging such a pulverized composite from such an apparatus.

Without limitation, such a graphite component can be present in an amount ranging from about 0.1 wt. % to about 10.0 wt. % of such a polymer-graphite mixture. While such a method is not limited to a particular homopolymer or corresponding copolymer, such a polymer component can be selected from olefinic polymers and copolymers. Without limitation, in certain embodiments, such a polymer component can be a polypropylene.

In part, the present invention can also be directed to a polymer composition comprising a polymer component and particles of as-received graphite dispersed therein, such a graphite not a graphite oxide nor an expanded graphite, such a composition as can be substantially absent particle agglomeration, such dispersion as can be characterized by scanning electron microscopy and the absence of cracks and/or voids at micron length scales under microscopy conditions of the sort described herein or as would otherwise be understood by those skilled in the art made aware of this invention. In certain embodiments, such a polymer component can be selected from a range of available homopolymers and corresponding copolymers, including but not limited to various olefinic polymers and copolymers. Graphite content is limited only by an amount sufficient to at least partially achieve a desired physical, mechanical and/or morphological property. Without limitation as to polymer component or graphite content, such a composition can be incorporated into an article of manufacture.

In part, the present invention can also be directed to a polymer composition comprising a polypropylene and nanodimensioned graphite platelets dispersed therein, such a composition as can be the solid-state shear pulverization product of a mixture comprising polypropylene and as-received graphite, such dispersion as can be characterized by x-ray diffraction and inter-graphene sheet spacing of such graphite nanoplatelets under x-ray diffraction conditions of the sort described herein or as would otherwise be understood by those skilled in the art.

In certain embodiments, one or more nanoplatelets can comprise less than about 30 graphene sheets, such a parameter as can be indicative of graphite exfoliation and/or dispersion. In certain such embodiments, without limitation, one or more nanoplatelets can comprise a thickness dimension of about 10 nm. Regardless, the graphite content of such a composition is limited only by desired physical, mechanical and/or morphological property, such content as can range from about 0.1 wt. % to about 10.0 wt. % of the polymer composition.

BRIEF DESCRIPTION OF THE DRAWINGS

FIGS. 1A-E. Digital images of melt-pressed, 01 mm thick sheets of (A) PP/2.8 wt % graphite hybrid made by single-screw melt extrusion and (B) PP/2.5 wt % graphite nanocomposite fabricated in the solid state by SSSP. Scanning electron micrographs of fractured surfaces of compression-molded specimens of (C) PP/2.8 wt % graphite hybrid made by single-screw melt extrusion and (D) PP/2.5 wt % graphite nanocomposite fabricated in the solid state by SSSP. Field-emission scanning electron micrograph of (E) PP/2.5 wt % graphite nanocomposite fabricated in the solid state by SSSP. Note: all graphite used in making hybrids and nanocomposites was as-received graphite (ARG).

DETAILED DESCRIPTION OF CERTAIN EMBODIMENTS

Figure 2:
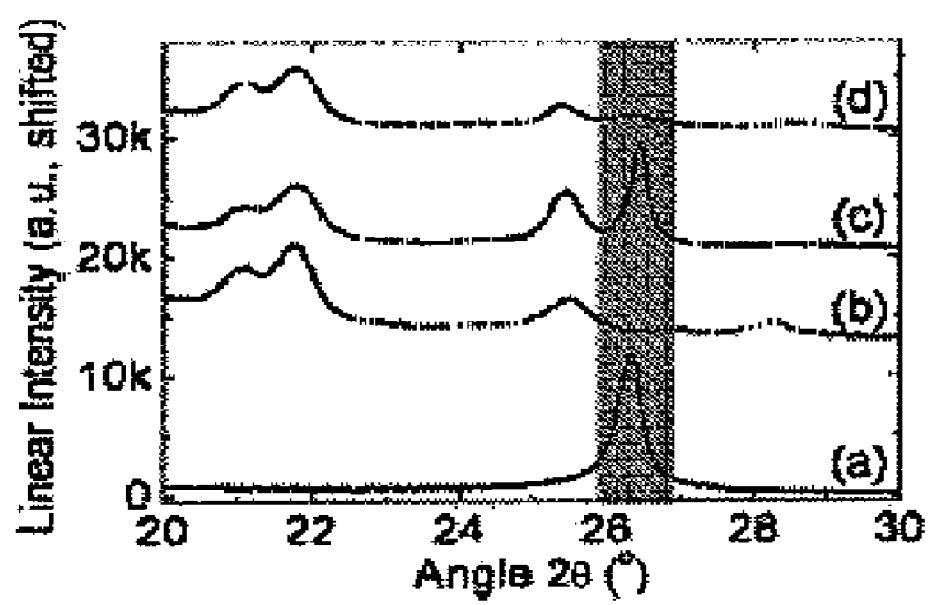
FIG. 2. X-ray diffraction data of (a) as-received graphite (ARG), (b) neat PP, (c) PP/2.8 wt % ARG hybrid fabricated by melt extrusion, and (d) PP/2.5 wt % ARG nanocomposite fabricated by SSSP. Highlighted area is the region near the characteristic diffraction angle ($2\theta=\sim26.6°$) corresponding to the inter-graphene sheet spacing in graphite.

Representative of certain non-limiting embodiments of this invention, and as discussed more fully below, thermal, mechanical and physical properties, as well as crystallization kinetics can be realized for a range of polymers, e.g., without limitation, polyethylene, polypropylene, c-polycaprolactone, poly(butylene terephthalate) and poly(ethylene terephthalate) and the like. While certain data, observations and/or results may be described in conjunction with one or particular mechanisms or phenomena, it will be understood by those skilled in the art that this invention is not limited by any one theory or mode of operation.

Regardless, such results and/or enhancements can be obtained using SSSP processing conditions. More generally, pulverization can be accomplished with an SSSP apparatus of the sort described herein or as would otherwise be known in the art, such apparatus, component construction, screw elements, transport elements, kneading or shearing elements, and spacer elements and/or the sequence or design thereof selected or varied as required to accommodate a polymer starting material, pulverization parameters and/or pulverized polymer product. Such apparatus, components and operation are understood by those skilled in the art and, for instance, can be of the sort described more fully in U.S. Pat. Nos. 5,814,673; 6,180,685; 7,223,359 and co-pending application entitled, Enhancing the Physical Properties of Semi-Crystalline Polymers via Solid-State Shear Pulverization, filed Feb. 2, 2009—each of which is incorporated herein by reference in its entirety.

More specifically, the present invention can comprise use of SSSP to produce polymer-graphite nanocomposites that are not subject to the thermodynamic/kinetic limitations associated with conventional processes. A commercial SSSP apparatus (e.g., a modified twin-screw extruder to apply shear and compressive forces to solid-state materials) can be used in conjunction with a continuous, scalable SSSP process, to provide corresponding polymer nanocomposites comprising well-dispersed unmodified, as-received graphite (ARG). Without limitation, representative of various other embodiments, polypropylene (PP)—graphite nanocomposites of this invention can exhibit a 100% increase in Young's modulus and a ~60% increase in yield strength in comparison with neat PP.

FIG. 1 compares digital and SEM (FESEM) images of compression-molded samples of SSSP-made or melt-extruded PP hybrids containing nominally 3.0 wt % ARG. Thermogravimetric analysis reveals that the graphite content is 2.8±0.2 wt % for the extruded hybrid and 2.5±0.2 wt % for the SSSP-made hybrid. As shown in FIGS. 1A, and B, graphite is poorly dispersed in the extruded hybrid, with agglomerates at length scales of hundreds of microns, while the SSSP-made hybrid is uniformly black and substantially without agglomeration at the same magnification. Poor dispersion of ARG in melt-extruded samples is expected and is a driving force for the use of chemically/thermally modified graphite. Characterization via SEM shows cracks and voids in a melt-extruded sample that are tens of microns in size (FIG. 1C), resulting from graphite agglomerates, and the absence of cracks or voids at length scales of several microns in the SSSP sample (FIG. 1D). The FESEM image in FIG. 1E shows the presence of well-distributed graphite particles with lateral dimensions of ~0.3-5 μm.

To characterize graphite dispersion in the SSSP sample, XRD was employed. In nanocomposites containing organoclay, increasing exfoliation is associated with a reduction of the peak intensity in XRD characteristic of the repeated layer spacing. This same principle was applied in graphite-based samples. As seen in FIG. 2, ARG has a prominent, characteristic peak at $2\theta=26.6°$, corresponding to an inter-graphene sheet spacing of 0.335 nm. FIG. 2 also shows the X-ray diffractograms of neat PP and the PP-graphite hybrids made by extrusion and SSSP. Neat PP has several XRD peaks between 2θ=21.0° and 28.3°, consistent with the PP crystal unit cell. Both PP-ARG systems exhibit peaks associated with neat PP (although the ratio of the peak height at 25.6° to other peak heights is increased in the extruded hybrid). However, while the extruded hybrid exhibits a peak height at 26.6° that exceeds those of the PP XRD peaks, the peak associated with the inter-graphene sheet spacing is almost totally suppressed in the SSSP sample. Such results strongly suggest that significant exfoliation/dispersion of graphite is achieved during SSSP.

Figure 3A:
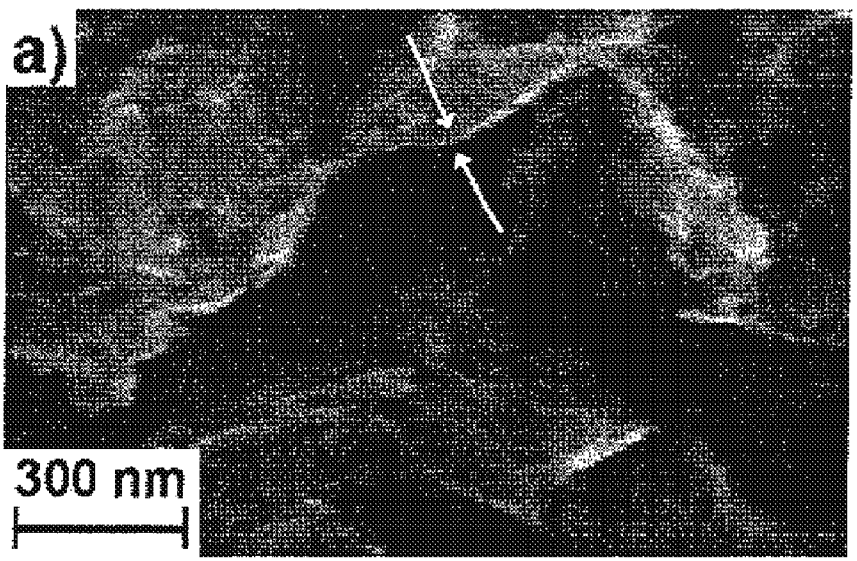
FIGS. 3A-B. Electron microscopy images of PP/2.5 wt % ARG nanocomposites made by SSSP: (A) field-emission scanning electron micrograph and (B) transmission electron micrograph.
Figure 3B:
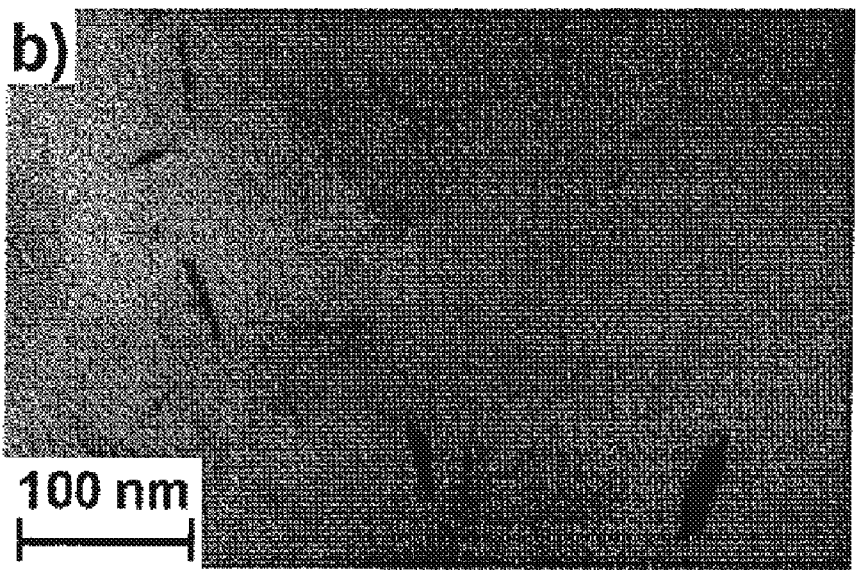

FIG. 3 augments this observation. The FESEM image (FIG. 3A) shows an edge-on view of a graphite nanoplatelet with ~10 nm thickness while the TEM image (FIG. 3B) shows a number of well-dispersed nanoplatelets with thickness ranging from several to ~10 nm. (The lateral dimensions of nanoplatelets could not be determined from TEM images. In the 70 nm thick cryomicrotomed TEM specimens, nanoplatelets of large lateral dimension are sliced to smaller sizes). Single, exfoliated graphene sheets are too thin to be observed unequivocally in such images; thus, no comment can be made regarding the exfoliation of individual graphene sheets. However, XRD and microscopy show that SSSP can lead to well-dispersed PP-graphite nanocomposites with nanoplatelets containing a few to roughly 30 graphene layers. Because the aspect ratio (lateral dimension to thickness) of the dispersed nanoplatelets is large after SSSP, mechanical property enhancements are expected.

Table 1 compares the tensile, impact strength (sometimes called impact toughness), and crystallization properties of the SSSP nanocomposite, the extruded hybrid, and neat PP. Relative to neat PP, the extruded hybrid exhibits a 40-45% increase in Young's modulus simply due to ARG incorporation; however, it is extraordinarily brittle, exhibiting a factor of 100 reduction in elongation at break. In contrast, relative to neat PP, the SSSP-made nanocomposite exhibits a 100% increase in Young's modulus and a ~60% increase in yield strength, with only a ~30% reduction in elongation at break. Such enhancements in room temperature modulus and yield strength have not been previously reported in polymer-graphite nanocomposites of the same of lower graphite content and made without solution/sonication-based processing or in nanocomposites made by coprocessing PP and organoclay with XRD-confirmed exfoliation.

The addition of graphite leads to dramatic changes in PP crystallization kinetics. Table 1 compares the nonisothermal crystallization onset temperature ($T_{c,onset}$) and the isothermal crystallization half-time ($\tau_{1/2}$) at 413 K of neat PP and PP-graphite systems. Relative to neat polymer, changes in $T_{c,onset}$ and $\tau_{1/2}$ are expected in many semicrystalline polymer-based hybrids because filler particles often act as nucleation sites. Changes are observed in our extruded PP-graphite hybrid, which exhibits a 12 K increase in $T_{c,onset}$ and a greater than factor of 12 reduction of $\tau_{1/2}$ relative to neat PP. However, the well-dispersed PP-graphite nanocomposite made by SSSP exhibits far larger changes, with a 21 K increase in $T_{c,onset}$ and a greater than factor of 33 reduction in $\tau_{1/2}$ relative to neat PP. While enhanced crystallization rates have been documented in PP nanocomposites, no study has reported such dramatically modified PP crystallization upon addition of similar nanofiller levels. Despite the changes in crystallization kinetics, within error the percent crystallinity is identical in PP-ARG systems and neat PP.

Such results demonstrate the use of SSSP for making well-dispersed nanocomposites and the promise of ARG for yielding major improvement in mechanical properties when dispersed in polymer at an appropriate weight percent (e.g., without limitation, about 2.5 wt. % or as determined for a particular end-use application). Assuming 2.5 wt % perfectly bonded, randomly oriented, flat platelets with an aspect ratio of 300-500, simple calculations suggest an upper limit of 4500-6300 MPa for the Young's modulus, roughly a factor of 3 greater than that observed in the SSSP-processed nanocomposite. (E.g., Calculations for the upper bound of the stiffness of nanocomposites at 2.5 wt % (~5 vol %) nanofiller content were performed via a Mori-Tanaka mircromechanics analysis using 3D randomly oriented, perfectly bonded, flat platelets of a 500 GPa modulus dispersed in a matrix with bulk polymer properties. Calculations are similar to that described in: Liu, H., Brinson, L. C. *J. Appl Mech* 2006, 73. 758-768.) Accordingly, use of SSSP as described herein can be used for nanofiller dispersion, exfoliation, and/or orientation to affect mechanical and other properties, including conductivity and thermal degradation temperature.

Examples of the Invention

The examples and data provided herein are without limitation and illustrate various aspects and features relating to

TABLE 1

Thermal and Mechanical Property Enhancement in PP - Graphite Composites[a]

| samples | tensile properties | | | impact strength | crystallization behavior | |
|---|---|---|---|---|---|---|
| | Young's modulus, E (MPa) | yield strength, $\sigma_y$ (MPa) | elongation at break, $\epsilon_B$ (%) | absorbed energy per thickness, W (J/cm) | crystallization temp, $T_{c,onset}$, at −10 K/min (K) | isotherma crystallization half-time, $\tau_{1/2}$, at 413 K (min) |
| neat PP | 910 ± 30 | 28 ± 2 | 810 ± 30 | 3.09 ± 0.49 | 390 | >120 |
| PP/2.8 wt % graphite melt extrusion | 1300 ± 50 | | | | 402 | 9.5 |
| PP/2.5 wt % graphite SSSP | 1870 ± 170 | 43 ± 3 | 560 ± 60 | 1.21 ± 0.15 | 411 | 3.6 |

[a]The values following ± are errors of one standard deviation. The complete data set is included in Table S1 of the Supporting Information Reduced impact strength normally accompanies addition of rigid filler to a relatively tough polymer. Table 1 shows that both PP-graphite systems exhibit large reductions in impact strength relative to neat PP. However, the SSSP-processed nanocomposite has an impact strength that is ~45% greater than that of the extruded hybrid.

the compositions and/or methods of the present invention, including the preparation of nanocomposites comprising polymers and as-received graphite components, as are available through these processes and synthetic methodologies described herein. In comparison with the prior art, the present compositions and/or methods provide results and data which are surprising, unexpected and contrary thereto. While the utility of this invention is illustrated through the use of several polymer compositions and graphite components which can be used therewith, it will be understood by those skilled in the art that comparable results are obtainable with various other polymer and graphite components as are commensurate with the scope of this invention.

Polypropylene (Total Petrochemicals, MFI=1.8 g/10 min at 230° C.) and unmodified, as-received graphite (ARG) (Asbury Carbons) were used without pretreatment. Polypropylene pellets and graphite particles (3.0 wt %) were manually blended prior to being fed to a Berstorff ZE-25P pulverizer, in which they were copulverized to yield a powder output. Details regarding SSSP process and equipment are known to those skilled in the art made aware of this invention. (See, e.g., Furgiuele, N.; Lebovitz, A. H.; Khait, K.; Torkelson, J. M. *Macromolecules* 2000, 33, 225-228; Furgiuele, N.; Lebovitz, A. H.; Khait, K.; Torkelson, J. M. *Polym Eng. Sci* 2000, 40, 1447-1457; Lebovitz, A. H.; Khait, K.; Torkelson, J. M. *Macromolecules* 2002, 35, 8672-8675; Kasimatis, K. G.; Torkelson, J. M. *PMSE Prepr* 2005, 92, 255-256; Tao, Y.; Kim, J.; Torkelson, J. M. *Polymer* 2006, 47, 6773-6781; and Walker, A. M.; Tao, Y.; Torkelson, J. M. *Polymer* 2001, 48, 1066-1074; Lebovitz, A. H.; Khait, K.; Torkelson, J. M. *Polymer* 2003 44, 199-206—each of which is incorporated herein by reference in its entirety.) Generally, parameters (screw design, barrel size, feed rate, etc.) can be chosen to yield moderately harsh shear/compression conditions. For comparison, composite material with similar filler content was fabricated via single-screw melt extrusion (Randcastle RCP-0625). Graphite contents in SSSP and extrusion outputs were determined by thermogravimetric analysis (Mettler-Toledo 851e).

Materials were compression-molded at 483 K. X-ray diffraction (XRD) was measured using a Rigaku ATX-G apparatus. Scanning electron microscopy (SEM; Hitachi S3500N) was conducted on cryofractured surfaces of molded samples coated with 3.5 nm gold/palladium (Cressington 208HR sputter-coater). Transmission electron microscopy (TEM; JEOL 1230) was done on 70 nm thick cryomicrotomed specimens (Leica Ultracut S). Field-emission SEM (FESEM; LEO 1525) was conducted as described in the literature. (See, e.g., Stankovich, S.; Dikin, D. A.; Dommett, G. H. B.; Kohlhaas, K. M.; Zimney, E. J.; Stach, E. A.; Piner, R. D.; Nguyen, S. T.; Ruoff, R. S., *Nature* (London) 206,442, 282-286, the entirety of which is incorporated herein by reference. Crystallization was characterized by differential scanning calorimetry (DSC; Mettler-Toledo 822e), employing nonisothermal 10 K/min ramp and isothermal crystallization halftime analyses. Tensile properties (Sintech 20/G) and impact strength (Tinius Olsen IT 504) were measured according to ASTM D1708 and D4812, respectively.

Generally, a pre-weighed amount of graphite is added to a pre-weighed amount of polymer in a plastic bag or container, which is then shaken thoroughly, resulting in adherence of graphite to the polymer particles or pellets. This mixture is then directly added to a hopper which feeds the graphite/polymer mixture into the pulverizer apparatus at a given rate. The graphite content of the resulting nanocomposite product is determined by thermogravimetric analysis, with the mass remaining after polymer degradation relative to total initial mass placed in the thermogravimetric analyzer taken as the mass or weight fraction of the graphite in the mixture.

As discussed above, pulverization was accomplished on a Berstorff pulverizer apparatus, although various other commercial apparatus can be used, consistent herewith, as would be understood by those skilled in the art. Screw speeds can be chosen to vary between 50 and 400 rpm, with feed rates from tens of grams per hour to in excess of 1,000 grams per hour, depending on the polymer and level of graphite being pulverized. Relating more specifically to the embodiments described herein, screw designs typically consisted of two-four screw elements in the mixing zone and seven screw elements in the pulverization zone, with the remaining elements as conveying elements. The distribution of forward, reverse and neutral screw elements are chosen as a function of polymer type used in making the nanocomposites. Such screw designs and related apparatus and process parameters would be understood by those skilled in the art made aware of this invention, as described above and/or in conjunction with the aforementioned incorporated references. Cooling was typically used throughout all accessible regions of the pulverizer, with the cooling medium comprising an ethylene glycol-water mix maintained at 266 K. (It will be understood that because the cooling medium only cools the outside of the barrels that contain both the polymeric system being pulverized and the pulverizer screws, the polymeric material being pulverized is at a temperature in excess of the cooling medium.)

In further illustration of this invention, representative, non-limiting polypropylene graphite nanocomposites were made by SSSP to further demonstrate property enhancements of the sort available through this invention. See, Table 2, below.

TABLE 2

Property Enhancements in Polypropylene-Graphite Nanocomposites Made by SSSP

| Graphite Content (wt %)* | Young's Modulus (MPa) | Yield Strength (MPa) | Degradation Temperature @ 5 wt % loss** | Electrical Conductivity (S/m)** |
|---|---|---|---|---|
| 0.00 | 910 +/− 30 | 28 +/− 2 | 403° C. | $<10^{-12}$ |
| 0.3 | 1360 +/− 250 | 39 +/− 2 | 416° C. | $<10^{-12}$ |
| 0.7 | 1480 +/− 280 | 40 +/− 2 | 418° C. | $2.3 \times 10^{-9}$ |
| 2.5 | 1870 +/− 170 | 43 +/− 3 | 430° C. | $2.8 \times 10^{-4}$ |
| 3.6 | 1270 +/− 80 | 34 +/− 2 | 435° C. | $3.9 \times 10^{-4}$ |
| 8.4 | 1370 +/− 70 | 33 +/− 3 | 438° C. | $2.3 \times 10^{-3}$ |

*Data obtained by thermogravimetric analysis (graphite content is mass remaining after all polypropylene has been degraded at elevated temperature; degradation temperature is measured as the temperature at which there is a 5 wt % loss of total mass when the nanocomposite sample is heated at a rate 10° C./min)

**Electrical conductivity was evaluated on broken impact test specimens, where the measurements were made across the width of the slab. Copper strips of 40 mm × 3.4 mm × 0.1 mm were used as electrodes, and liquid silver (PELCO Colloidal Silver) was applied between the specimen and the electrodes to ensure full electrical contact. This sample assembly was sandwiched between two PMMA slabs, held in place by screws. The samples were subjected to a room temperature frequency sweep from $10^{-2}$ to $10^7$ Hz with 0.1 V AC in a Solartron 1260 impedance spectrometer, from which conductivity values (κ) were calculated from the real component of measured impedance.

We claim:

1. A polymer composition comprising a solid-state shear pulverization product of a polymer component and as-received graphite, with particles of said graphite dispersed therein, said graphite not a graphite oxide and not an expanded graphite, said composition substantially absent agglomeration of said particles, said dispersion characterized by scanning electron microscopy and the absence in said composition of at least one of cracks and voids at micron length scales under conditions of said microscopy.

2. The composition of claim 1 wherein said graphite is present in an amount ranging from about 0.1 wt. % to about 10.0 wt. % of said polymer composition.

3. The composition of claim 1 wherein said polymer component is selected from homopolymers and copolymers thereof.

4. The composition of claim 3 wherein said polymer component is selected from polyolefins and copolymers of said polyolefins.

5. The composition of claim 1 incorporated into an article of manufacture.

6. A polymer composition comprising polypropylene and nanodimensioned graphite platelets dispersed therein, said composition comprising a solid-state shear pulverization product of a mixture comprising polypropylene and as-received graphite, said graphite not a graphite oxide and not an expanded graphite, said dispersion characterized by x-ray diffraction of said composition and inter-graphene sheet spacing of said graphite nanoplatelets under conditions of said x-ray diffraction.

7. The composition of claim 6 wherein a said nanoplatelet comprises less than about 30 graphene sheets.

8. The composition of claim 6 wherein a said nanoplatelet has a thickness dimension of about 10 nm.

9. The composition of claim 6 wherein said graphite is present in an amount ranging from about 0.1 wt. % to about 10.0 wt. %.

10. The composition of claim 6 incorporated into an article of manufacture.

\* \* \* \* \*